(12) United States Patent
Jabusch (10) Patent No.: US 9,789,849 B2
(45) Date of Patent: Oct. 17, 2017

(54) SAFETY BELT RETRACTOR WITH A TWO-SPRING COMFORT FUNCTION

(71) Applicant: Autoliv Development AB, Vårgårda (SE)

(72) Inventor: Ronald Jabusch, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 119 days.

(21) Appl. No.: 14/765,989

(22) PCT Filed: Jan. 27, 2014

(86) PCT No.: PCT/EP2014/051490
§ 371 (c)(1),
(2) Date: Aug. 5, 2015

(87) PCT Pub. No.: WO2014/122039
PCT Pub. Date: Aug. 14, 2014

(65) Prior Publication Data
US 2015/0367814 A1  Dec. 24, 2015

(30) Foreign Application Priority Data
Feb. 5, 2013  (DE) ........................ 10 2013 201 849

(51) Int. Cl.
*B60R 22/44*  (2006.01)
(52) U.S. Cl.
CPC ...... *B60R 22/44* (2013.01); *B60R 2022/4413* (2013.01); *B60R 2022/4426* (2013.01)
(58) Field of Classification Search
CPC ............ B60R 22/44; B60R 2022/4413; B60R 2022/4426
See application file for complete search history.

(56) References Cited

U.S. PATENT DOCUMENTS

| | | | |
|---|---|---|---|
| 4,215,830 A | | 8/1980 | Cunningham et al. |
| 4,809,925 A | * | 3/1989 | Takada .................... B60R 22/44 |
| | | | 242/372 |
| 4,913,372 A | | 4/1990 | Takada |
| 4,993,657 A | * | 2/1991 | Brown .................... B60R 22/44 |
| | | | 242/372 |
| 5,553,802 A | * | 9/1996 | Park ....................... B60R 22/44 |
| | | | 242/372 |

(Continued)

FOREIGN PATENT DOCUMENTS

| | | |
|---|---|---|
| DE | 27 36 998 | 1/1979 |
| DE | 37 32 465 A1 | 5/1988 |

(Continued)

OTHER PUBLICATIONS

PCT International Search Report—Apr. 2, 2014.
German Examination Report—Apr. 19, 2013.

*Primary Examiner* — Sang Kim
(74) *Attorney, Agent, or Firm* — Brinks Gilson & Lione (57) ABSTRACT

The invention relates to a safety belt retractor that has a two-spring comfort function, a belt shaft which is rotatably mounted in a housing and on which a safety belt can be wound, and at least two return springs that are spring-loaded in the winding direction of the belt and act between the housing and the belt shaft. The return springs being able to be connect by one end to the belt shaft or the housing by means of a shift device that shifts as a function of the extraction length of the safety belt.

16 Claims, 11 Drawing Sheets

(56) References Cited

U.S. PATENT DOCUMENTS

| | | | | | |
|---|---|---|---|---|---|
| 6,149,093 | A | * | 11/2000 | Kwag | ................ B60R 22/44 242/372 |
| 2001/0022330 | A1 | * | 9/2001 | Mitsuo | ................ B60R 22/44 242/372 |
| 2012/0048982 | A1 | * | 3/2012 | Osaki | ................ B60R 22/44 242/373 |

FOREIGN PATENT DOCUMENTS

| | | |
|---|---|---|
| DE | 43 15 886 A1 | 11/1994 |
| DE | 196 11 748 A1 | 9/1997 |
| DE | 199 52 371 C1 | 4/2001 |
| DE | 101 62 374 C1 | 8/2003 |
| DE | 103 38 865 A1 | 3/2005 |
| DE | 10 2009 011 091 A1 | 9/2010 |
| FR | 2 478 471 | 3/1980 |
| GB | 2 232 062 A | 5/1989 |

\* cited by examiner

SAFETY BELT RETRACTOR WITH A TWO-SPRING COMFORT FUNCTION

CROSS REFERENCE TO RELATED APPLICATIONS

This application claims priority to German Patent Application No. 10 2013 201 849.5 filed on Feb. 5, 2013 and PCT International Patent Application No. PCT/EP2014/051490, filed on Jan. 27, 2014.

FIELD OF THE INVENTION

The invention relates to a seatbelt retractor having a two-spring comfort function.

BACKGROUND AND INTRODUCTORY DESCRIPTION

Seatbelt retractors having a two-spring comfort function are known in principle from the publications DE 43 15 886 A1, DE 196 11 748 C2, DE 199 52 371 C1, DE 101 62 374 C1, and DE 103 38 865 A1 and serve to wind up the seatbelt with a higher spring force when removing than when wearing, by which an increased feeling of comfort is conveyed to the occupant by the reduced retraction force of the seatbelt when worn. In those solutions the different spring force acting on the seatbelt is realized by two retraction springs having a different spring force. The stronger retraction spring, also known as the roll-up spring, is tensioned by its outer end in a fixed manner with respect to the housing attached by its inner end to a ratchet wheel of the webbing spool. The weaker retraction spring, also referred to as the comfort spring, is held by its outer end on the ratchet wheel and by its inner end on a take-up sleeve connected to the belt shaft for conjoint rotation therewith. The retraction springs are thus connected in series. In principle, in this case the roll-up spring acts via the ratchet wheel, and the close-wound comfort spring acts on the belt shaft. The comfort spring only acts if the ratchet wheel is fixed with respect to the housing, so that the ratchet wheel in this case acts as a support for the comfort spring, which support is fixed with respect to the housing. In this case the roll-up spring is deactivated by the fixing of the ratchet wheel. Thus either the comfort spring or the roll-up spring act depending on whether the ratchet wheel is fixed. The ratchet wheel is fixed, depending on the extension length of the seatbelt, using a locking pawl whose movement is controlled by a mechanical counting mechanism, disposed on the belt shaft, or an actuator.

It is a disadvantage of this solution that during switching, i.e., during releasing of the ratchet wheel, the comfort spring is abruptly fully recoiled, wherein in particular with abrupt braking in the locked position relatively high forces act on the comfort spring and on the ratchet wheel. To reduce forces acting on the comfort spring during switching, it is proposed, e.g., in DE 196 11 748 C2, to provide an additional spring element between the ratchet wheel and the end of the comfort spring, which end is held on the ratchet wheel.

Against this background, the object of the invention is to provide a seatbelt retractor having an improved two-spring comfort function.

To achieve this object, according to the invention a seatbelt retractor having the features described herein is proposed.

In accordance with the basic principles of the invention it is proposed that the retraction springs are disposed in parallel between the belt shaft and the housing, and at least one of the retraction springs is connectable by one end to the belt shaft or the housing via a switch device switched depending on the extension length of the seatbelt. Using the proposed solution neither of the two retraction springs any longer needs to be fully recoiled during the switching process, since each of the retraction springs acts between the belt shaft and the housing independently of the respective other retraction spring. As a result, the problems known in the prior art do not arise, and furthermore the functioning of the retraction springs is not dependent on the functioning of the respective other retraction spring. In addition, one of the retraction springs can act practically permanently between the belt shaft and the housing, so that it provides a type of basic retraction force, while increasing of the retraction force to retract the seatbelt into the parked position is effected by connecting of the respective other retraction spring. Since the retraction springs act in parallel, the spring forces are added together, and neither of the retraction springs needs to be designed to apply the entire retraction force that is needed for winding up the seatbelt into the parked position. Here the spring characteristic curve can be matched to a specified characteristic curve by providing a number of retraction springs and optional connection, by simple constructive means via the switching device, of the ends of the retraction springs either to the belt shaft or to the housing.

It is further proposed that one of the ends of the retraction springs is held on a coupling part, on which a movable locking part is provided, which connects the coupling part to the belt shaft in one position, and that the movement of the locking part is controllable by the switching device. The coupling part and the locking part serve to connect the end of the retraction spring to the belt shaft or the housing, wherein the coupling part serves to hold the end of the retraction spring, and the locking part serves to produce the connection of the coupling part to the belt shaft or the housing.

It is further proposed that a take-up sleeve non-rotatably connected to the belt shaft is provided, on which take-up sleeve a second end of the retraction spring is non-rotatably held, and to which the locking part, in the position connecting the coupling part to the belt shaft, engages in a locking manner counter to the retraction direction of the safety belt. The take-up sleeve is thus used for connecting the two ends of the retraction springs to the belt shaft.

It is further proposed that the switching device includes a linearly displaceable switching part for controlling the movement of the locking part, and that the movement of the switching part by the switching device is controlled as a function of the extension length of the seatbelt.

In this case it is further proposed that the switching part is non-rotatably fixed to the housing and has a cam contour on which the locking part abuts. The locking part is disposed on the coupling part, which, in the position connecting the coupling disc to the belt shaft, executes the rotary movement of the belt shaft together with the coupling disc. The switching part, however, is non-rotatably secured to the housing, so that the locking part executes a relative rotary movement with respect to the switching part. In this case a movement of the locking part can very simply be forced by the abutment of the locking part on the cam contour, which movement is specified by the shape of the cam contour. Here the switching part having the cam contour can be brought into various positions by the linear switching movement. At the start of the extension movement the switching part can be located, e.g., in a position wherein the coupling part having the locking part can rotate without the locking part being forced to move, i.e., the locking part does not abut with the cam contour, or the cam contour has a course such that the locking part, despite abutting on the cam contour, is not forced to move. Due to the switching of the switching part the cam contour is linearly displaced into a second position wherein the locking part is forced into a pivoting movement, for example, due to which the connection between the coupling part and belt shaft is released. The reverse movement of the locking part is then effected by a return movement of the switching part into the original position and rotation of the belt shaft in the other direction.

It is further proposed that two projections are provided on the locking part, which projections each abut with the cam contour depending on the position of the switching part, and when abutting the cam contour, by execution of a relative movement of the locking part with respect to the switching part, control the movement of the locking part. In the case of the movement of the locking part out of the position connecting the coupling part to the belt shaft into the release position, the relative movement of the locking part is forced by the rotary movement of the belt shaft with respect to the switching part, since in this phase the locking part is connected to the belt shaft. In this case after the release of the locking part, the relative movement of the locking part for forcing the reverse movement is effected by the spring-force-supported movement of the coupling part with respect to the switching part.

Here the movement of the locking part is preferably controlled such that for connecting the coupling part and/or for releasing the connection of the coupling part to the belt shaft it is moved to a ready position, from which, supported by the spring force of the retraction spring connected to the coupling part, it can be moved into a final position that connects or does not connect the coupling part to the belt shaft. The ready position can thus be regarded as a type of prepositioning, from which the locking part can rotate into a final position only by the spring-force-supported further rotating movement. Such a ready position is useful in particular for releasing the connection between the coupling part and the belt shaft, since the movement direction of the locking part during this movement sequence must be reversed in a final phase to a pure rear engagement behind of the locking part.

It is further proposed that the retraction springs are formed by two coil springs disposed parallel to each other, and the coupling part by a coupling disc disposed between the coil springs. Using the proposed solution a constructively simpler design results, and the coupling part furthermore serves, due to its disc shape, as a lateral abutment surface for at least one of the retraction springs.

In particular the locking part can be formed by a pivotable locking pawl. Here the locking pawl is preferably supported on the coupling part.

A very cost-effective, purely mechanical solution of the switching device can thereby be realized by a switching device in the form of a mechanical counting mechanism driven by the belt shaft. Here the counting mechanism serves as a device for detecting an extension length of the seatbelt, which extension length is specified by the design of the counting mechanism. Here conceivable and proven embodiments of the counting mechanism are wobble transmissions or reduction gearboxes including a plurality of mutually engaging gear wheels and corresponding switching cams, or even a control disc driven via a reduction gearbox.

A particularly constructively simple embodiment of the counting mechanism can be realized in that a counting mechanism having a wobble disc driven by the belt shaft via an eccentric, which wobble disc traverses the belt shaft with a gearing in a housing-fast gearing, and in that two projections are provided, both on the wobble disc and on the switching part, which projections in one position each abut with one another in pairs, and thereby force the linear switching movement of the switching part. In this case the counting mechanism is realized solely by two additional parts, namely the eccentric and the wobble disc, which are cost-effectively manufacturable in high volume as injection-molded parts.

Alternatively, the switching device can also include an electrically operable actuator, which allows particularly precise control of the switching movement. Here either the movement of the locking part can be directly controlled, or the movement of the switching part can be controlled.

Furthermore, preferably identical retraction springs can be used, whereby the manufacturing costs can be reduced further.

It is further proposed that the switching device is disposed such that it intersects at least one plane spanned by the retraction springs, wherein the switching device is particularly preferably disposed inside the innermost winding of one of the retraction springs. Using the proposed solutions the necessary installation space requirement can be reduced and a particularly compact seatbelt retractor can be provided. Furthermore, the switching device is thereby already disposed spatially very close to one of the ends of the retraction spring, so that the switching movement can be transmitted very simply to this end.

BRIEF DESCRIPTION OF THE DRAWINGS

The invention is explained in the following based on a preferred embodiment with reference to the accompanying figures.

FURTHER DETAILED DESCRIPTION OF THE INVENTION

Figure 1:
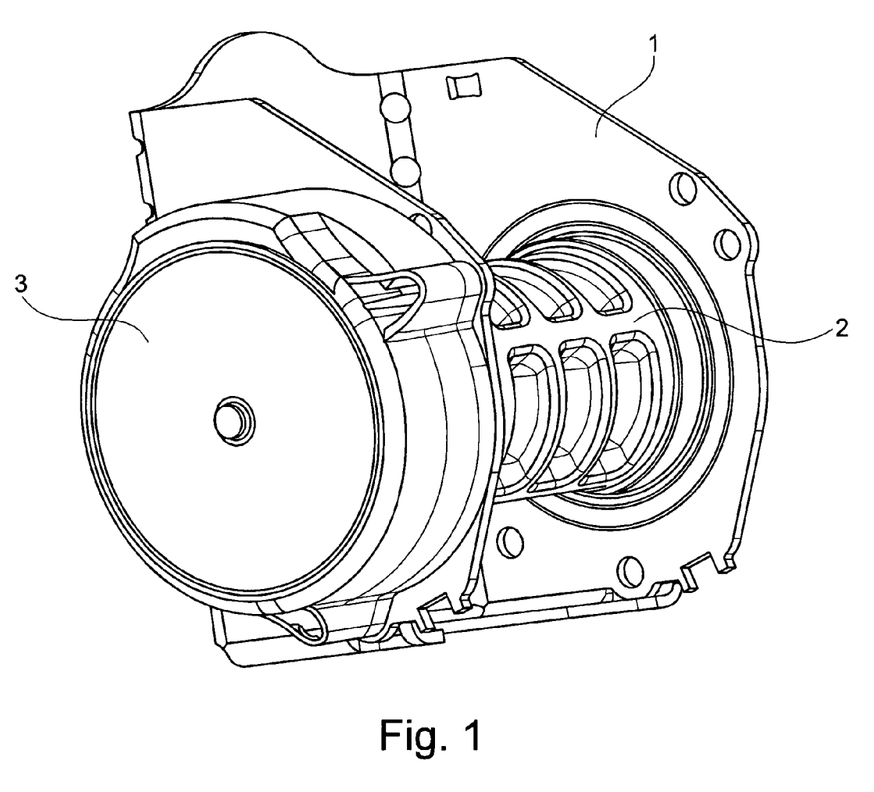
FIG. 1 shows a seatbelt retractor in oblique view.

An inventive seatbelt retractor including a belt shaft 2 rotatably supported in a housing 1 can be seen in FIG. 1. A spring cartridge 3 is non-rotatably held on the housing 1, in which spring cartridge 3 the inventive subassembly of the two-spring comfort function is disposed. A seatbelt (now shown) is windable onto the belt shaft 2. Furthermore, using a locking device the belt shaft 2 is lockable in a known manner depending on the extension acceleration of the seatbelt and the vehicle deceleration in the extension direction. When the terms "axial" and "radial" are used for the description of the invention, they are to be understood to be with respect to the axis of rotation of the belt shaft 2.

Figure 2:
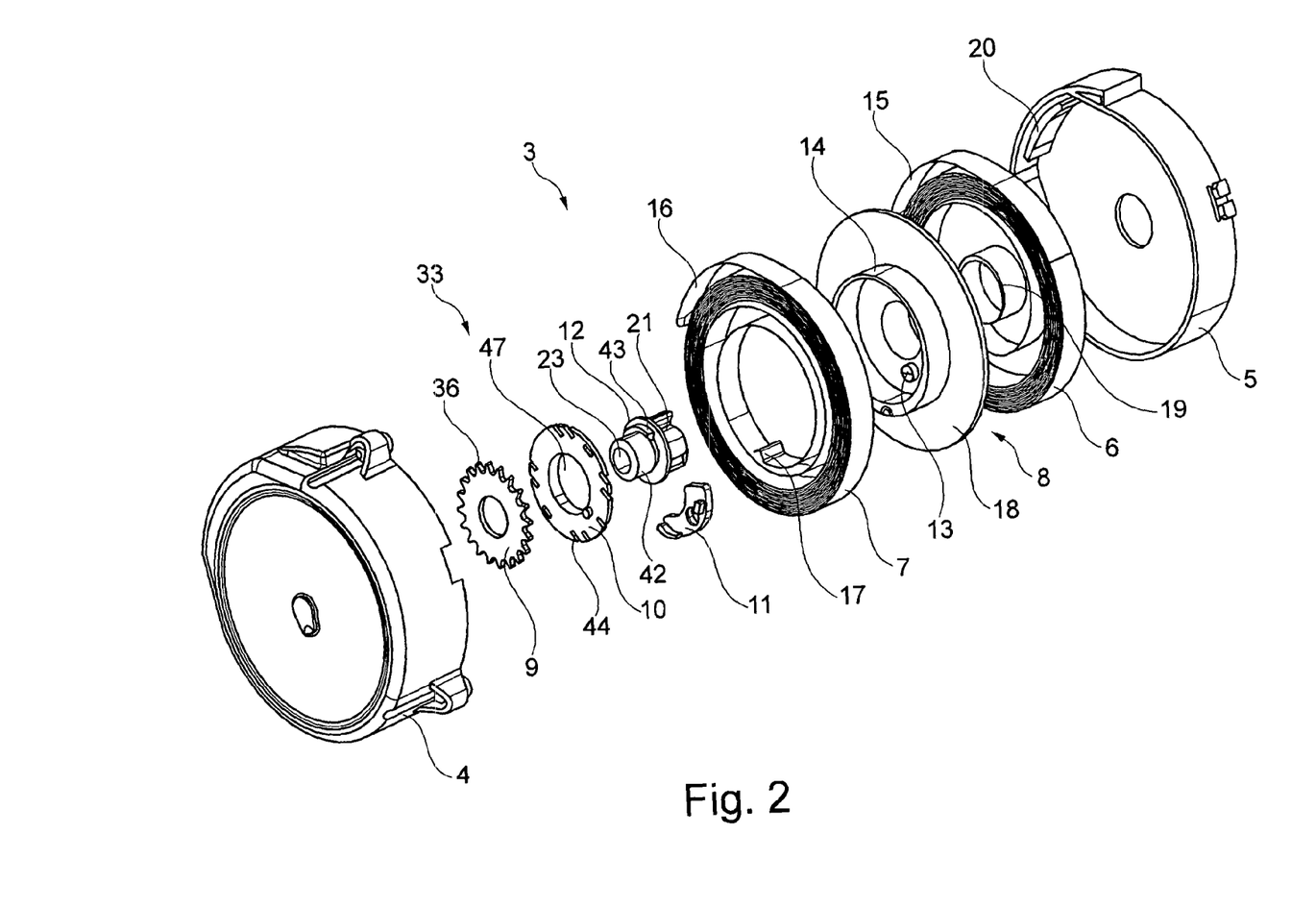
FIG. 2 shows a spring cartridge in exploded view.

In FIG. 2 the spring cartridge 3 including the individual parts can be seen in exploded view. The spring cartridge 3 comprises a housing 4, by which it is connectable, e.g., through a rivet connection, to the housing 1 of the seat belt retractor. The housing 4 is pot-shaped and is closable by means of a cover 5 non-rotatably connectable to the housing 4. The spring cartridge 3 further includes two retraction springs 6 and 7 in the form of coil springs, disposed and acting in parallel, a coupling part 8 in the form of a coupling disc, and a switching device 33.

The belt shaft 2 is provided with a pin (not shown) on which a take-up sleeve 12 is non-rotatably mounted. The first retraction spring 6 is securely hung by its first outer end 15 on a web 20 of the cover 5, and affixed by the second inner end 19 to a take-up contour 21 of the take-up sleeve 12 for conjoint rotation therewith, so that the first retraction spring 6 acts practically permanently between the cover 5 and the take-up sleeve 12. Since the take-up sleeve 12 is non-rotatably connected to the belt shaft 2, and the cover 5 is also non-rotatably connected to the housing 1 of the seatbelt retractor via the non-rotatable connection to the housing 4, the retraction spring 6 also acts between the belt shaft 2 and the housing 1 of the seatbelt retractor such that the belt shaft 2 is constantly spring-loaded in the winding direction by the retraction spring 6. Thus the seatbelt is wound onto the belt shaft 2 even if the second retraction spring 7 or the switching device 33 is inoperable. The first retraction spring 6 thus generates a basic retraction force of sorts.

The second retraction spring 7 is disposed to act in parallel, and is also geometrically parallel to the first retraction spring 6 and fixedly held on a lug (not shown) of the housing 4. The second retraction spring is held on a coupling part 8 by the second inner end 17. The coupling part 8 is configured as a coupling disc including a disc-shaped base body 18 and an axial ring 14 projecting from the base body 18, on which the second end 17 of the second retraction spring 7 is hung. Here the axial ring 14 serves not only for fixing the second end 17 of the second retraction spring 7, but additionally also as an abutment surface for the innermost winding of the second retraction spring 7. The disc-shaped base body 18 also guides the second retraction spring 7 and separates the two retraction springs 6 and 7. Furthermore, an axially projecting bearing pin 13 is provided on the base body, on which a locking part 11 in the form of a locking pawl is pivotably supported.

A locking contour 43 and an eccentric 42 are provided on the take-up sleeve 12 adjacent to the take-up contour 21, wherein in addition a bearing opening (bore) 23 is provided in the eccentric 42. The switching device 33 further includes a switching part 10 in the form of a switching disc including mutually-parallel straight slots 44, and a central oval opening 47, and a wobble disc 9 including an outer gearing 36.

Figure 3:
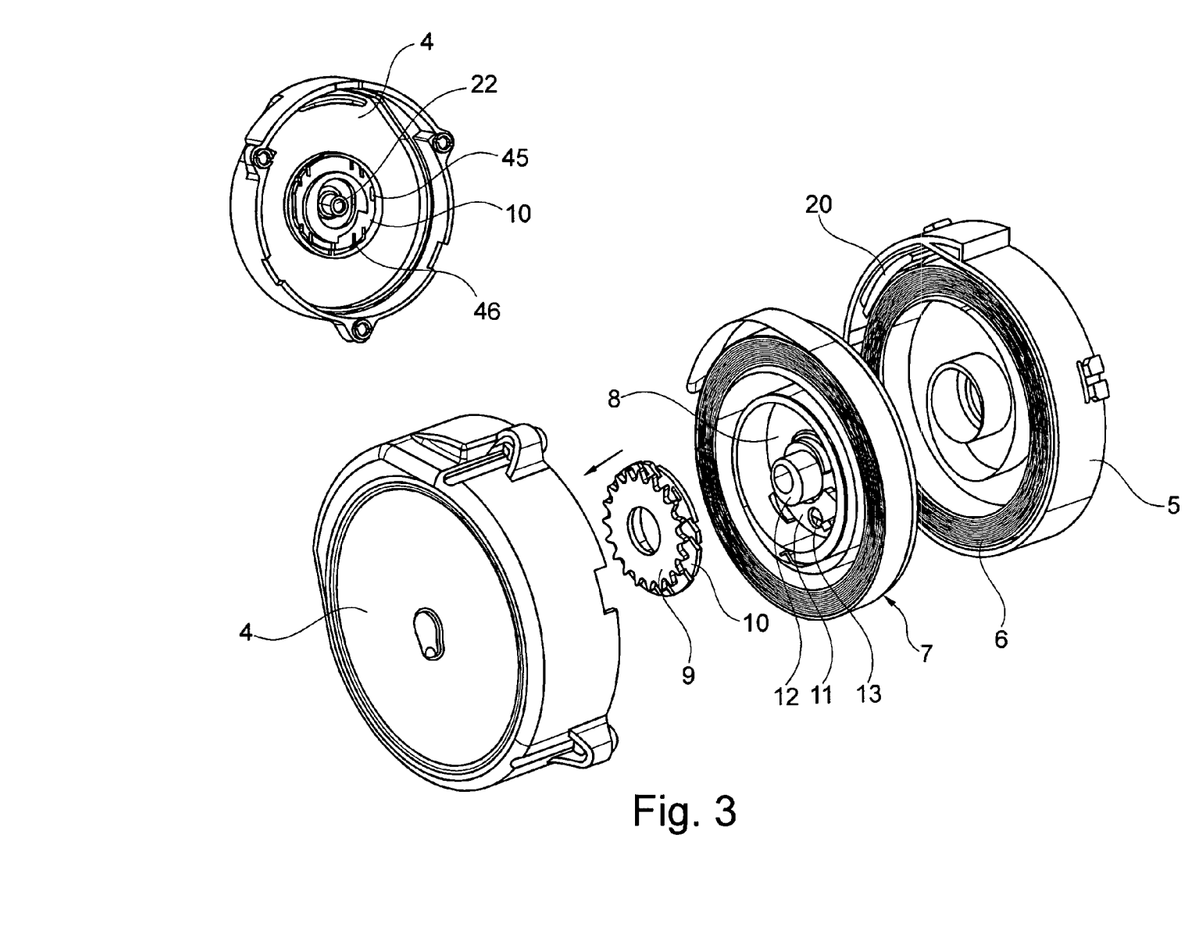
FIG. 3 shows a spring cartridge including preinstalled subassemblies, as an exploded view and a perspective view of the housing.

The spring cartridge 3 is assembled first by assembling various components, which can be seen in FIG. 3, into preassembled subassemblies.

The first retraction spring 6 is inserted into the cover 6 and attached here by the outer end 15 to the web 20 of the cover 5. The second retraction spring 7 is placed on the coupling part 8 and hung on the axial ring 14 by the inner second end 17. In addition, the locking part 11 is placed on the bearing pin 13, and the take-up sleeve 12 including the take-up contour is guided into a central opening of the coupling part 8. The switching part 10 is guided together with the wobble disc 9 into the housing 4 of the spring cartridge 3. For this purpose in the housing 4 an receptacle 45 is provided with an inner gearing 35, which can be seen in FIG. 6, and mutually parallel webs 46, into which the wobble disc 9 is guided together with the switching part 10. The wobble disc 9 is then disposed in a plane of the inner gearing 35, and the webs 46 engage the slots 44. The switching part 10 is smaller than the receptacle 45, and the slots 44 are longer than the webs 46, so that the switching part 10 is guided in the receptacle 45 in a linearly displaceable manner in the direction of the webs 46.

A central axially-oriented bearing pin 22 is provided on the housing 4, on which bearing pin the preassembled subassemblies formed of the coupling part 8, the second retraction spring 7, and the take-up sleeve 12 including the bearing opening 23 are subsequently placed. The bearing pin 22 is disposed coaxially to the axis of rotation of the belt shaft 2 so that the take-up sleeve 12 including the bearing opening 23 is disposed and supported coaxially to the belt shaft. The take-up sleeve 12 is provided with an eccentric 42 on the side facing the housing, on which eccentric 42 the wobble disc 9 is rotatably supported. The take-up sleeve 12 is non-rotatably connected to the belt shaft 2 so that the eccentric 42 revolves during the rotational movement of the belt shaft 2 and, due to the sectional engagement of the wobble disc 9 with the gearing 36 in the gearing 35 of the receptacle 45, a wobble movement counter to the direction of rotation of the belt shaft 2 is forced, during which the wobble disc 9 including the gearing 36 rolls in the inner gearing 35 of the receptacle 45.

Figure 4:
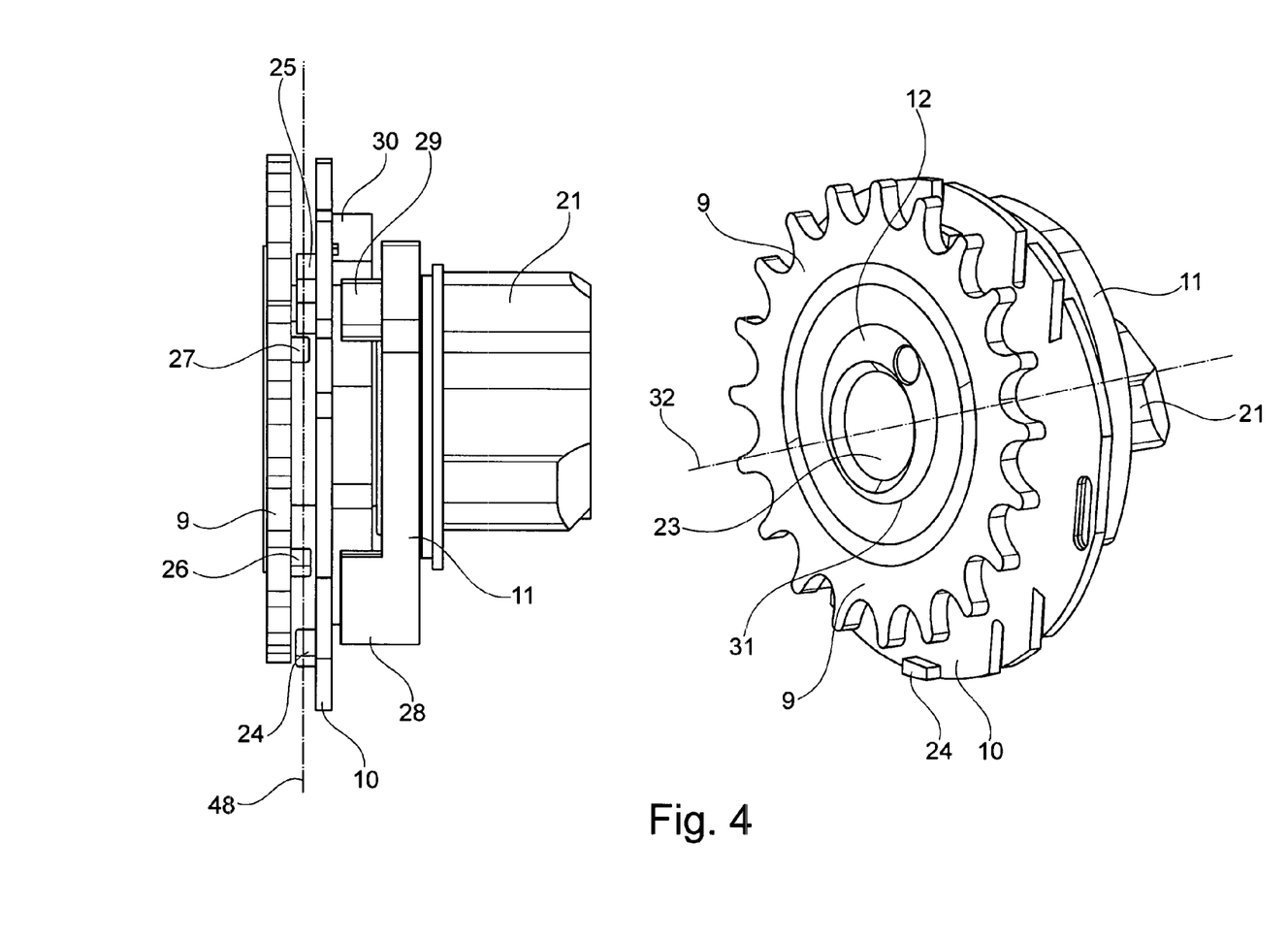
FIG. 4 shows a switching device including a wobble drive in side view and as a perspective view.
Figure 5:
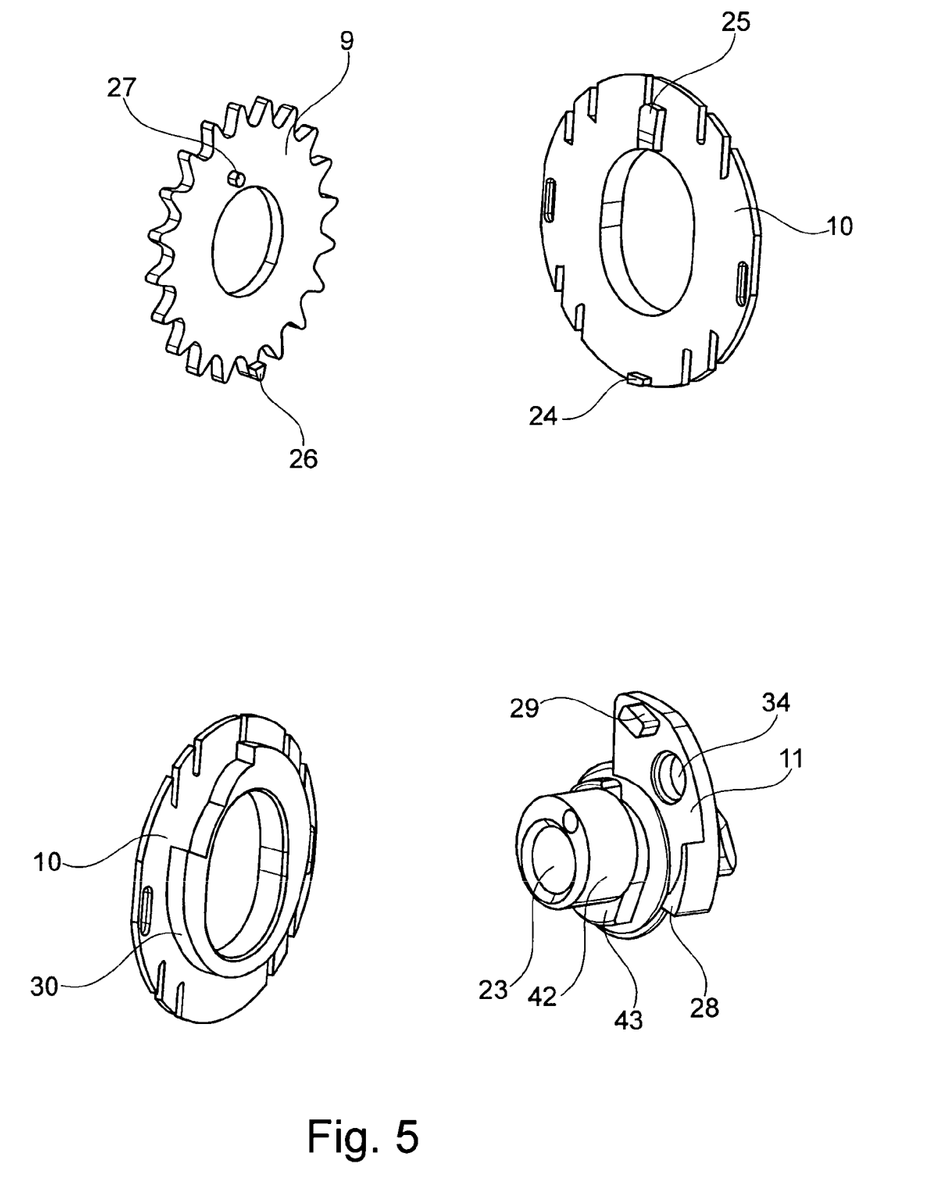
FIG. 5 shows the switching device including the individual parts in perspective views.

In FIGS. 4 and 5 the wobble disc 9, the switching part 10, and the locking part 11 can be seen enlarged, assembled, and as individual parts. Two axially protruding projections 28 and 29 disposed on the same side, and a bearing opening 34 for supporting on the bearing pin 13 are provided on the locking part 11. The locking part 11 abuts radially inwardly on the locking contour 43 of the take-up sleeve 12, in a direction such that the projections 28 and 29 protrude towards the eccentric 42. The wobble disc 9 is placed together with the switching part 10 on the eccentric 42, wherein the switching part 10 is linearly displaceable on the eccentric 42 due to the oval opening 47. A cam contour 30 is disposed on the side of the switching part 10 facing the locking part 11, which cam contour 30 is projected beyond on the radial outer side by the projections 28 and 29 of the locking part 11 in the assembled position of the components. Furthermore, two projections 24 and 25, and 26 and 27, are respectively provided both on the switching part 10 and on the wobble disc 9 on the mutually facing side surfaces, which projections 24 and 25, and 26 and 27, are dimensioned in length such that they project into a common switching plane 48.

Figure 9:
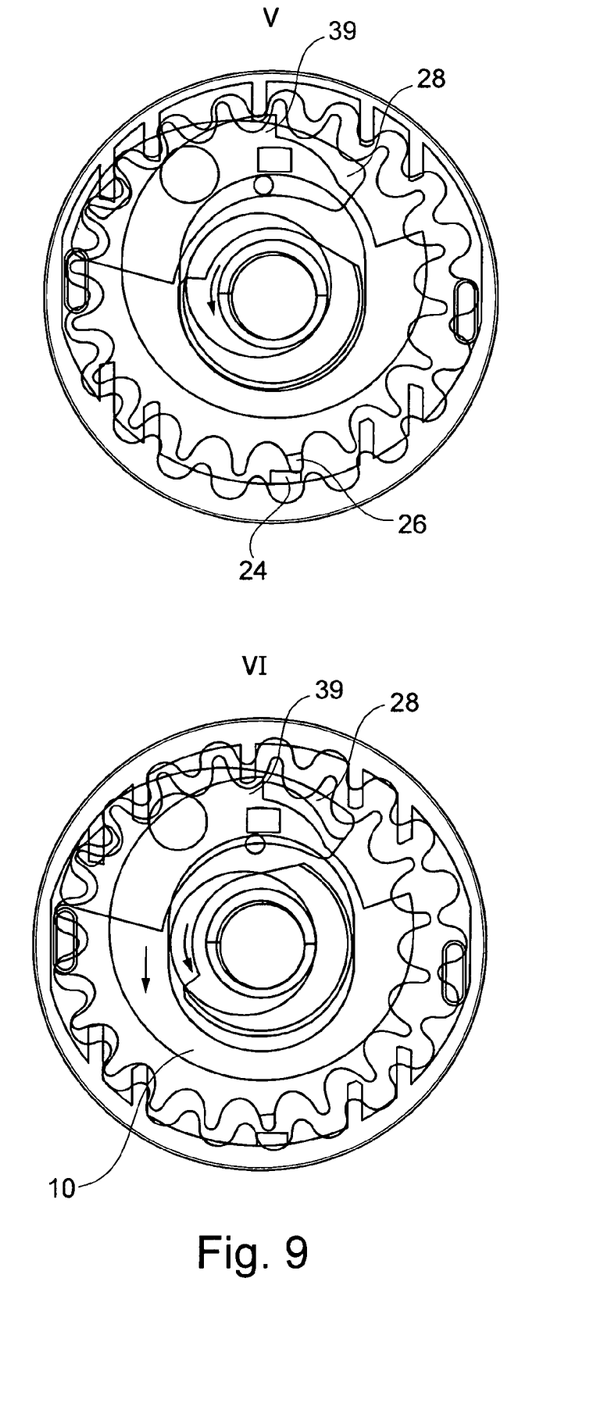
Figure 10:
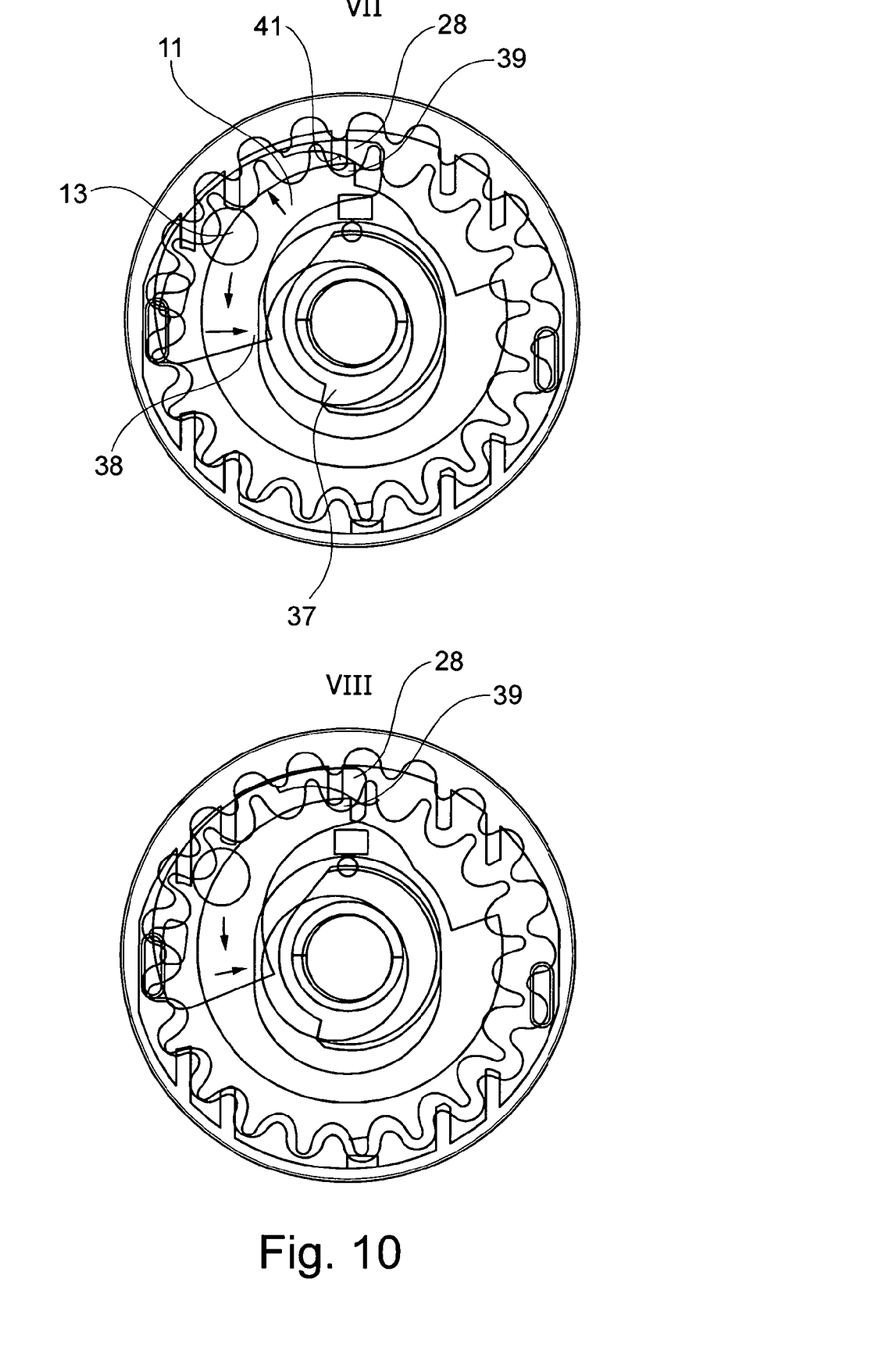
Figure 11:
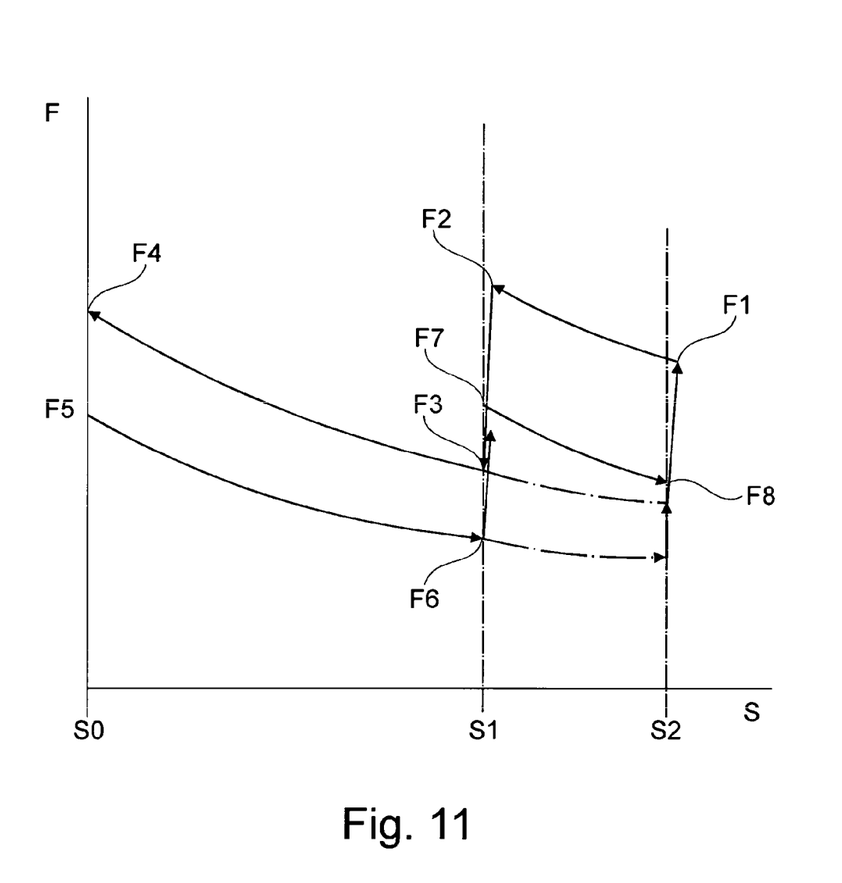
FIG. 11 shows a spring characteristic curve of the inventive two-spring comfort function of the seatbelt retractor.

In FIGS. 6 to 10 the function of the switching device 33 is explained in more detail using various positions of the components, wherein the spring forces respectively acting in the various positions are plotted in the diagram depicted in FIG. 11 over the extension length of the seatbelt.

Figure 6:
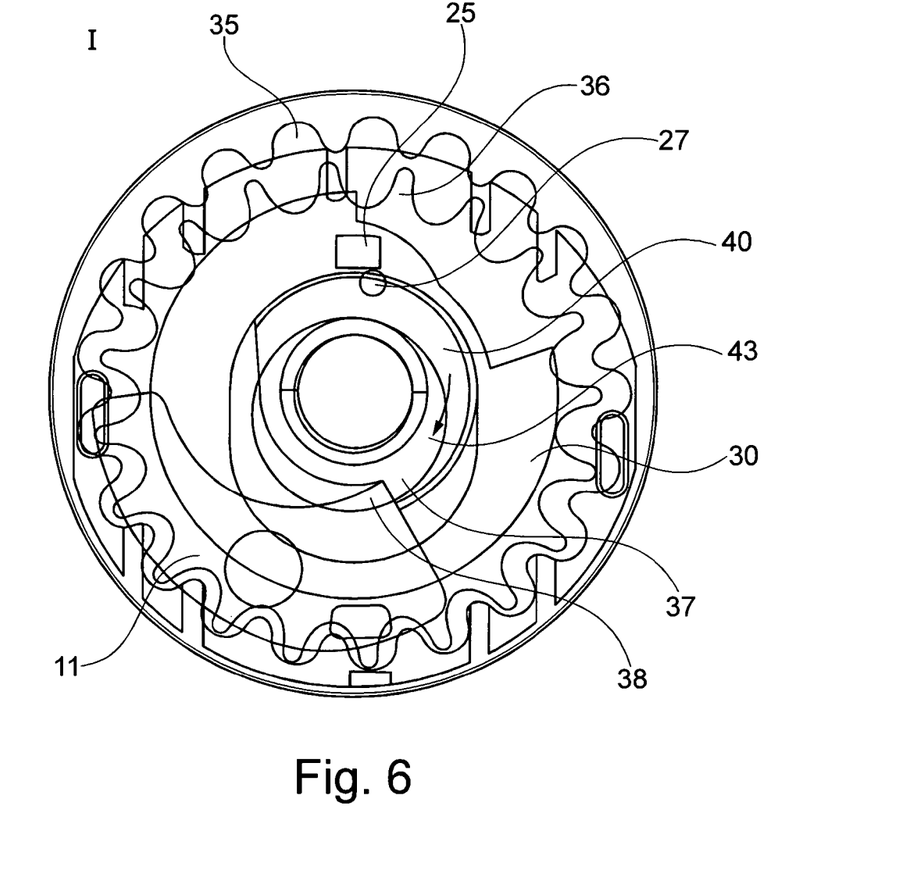
FIGS. 6 through 10 show the switching device in various positions during the retraction and the extension of the seatbelt.
Figure 7:
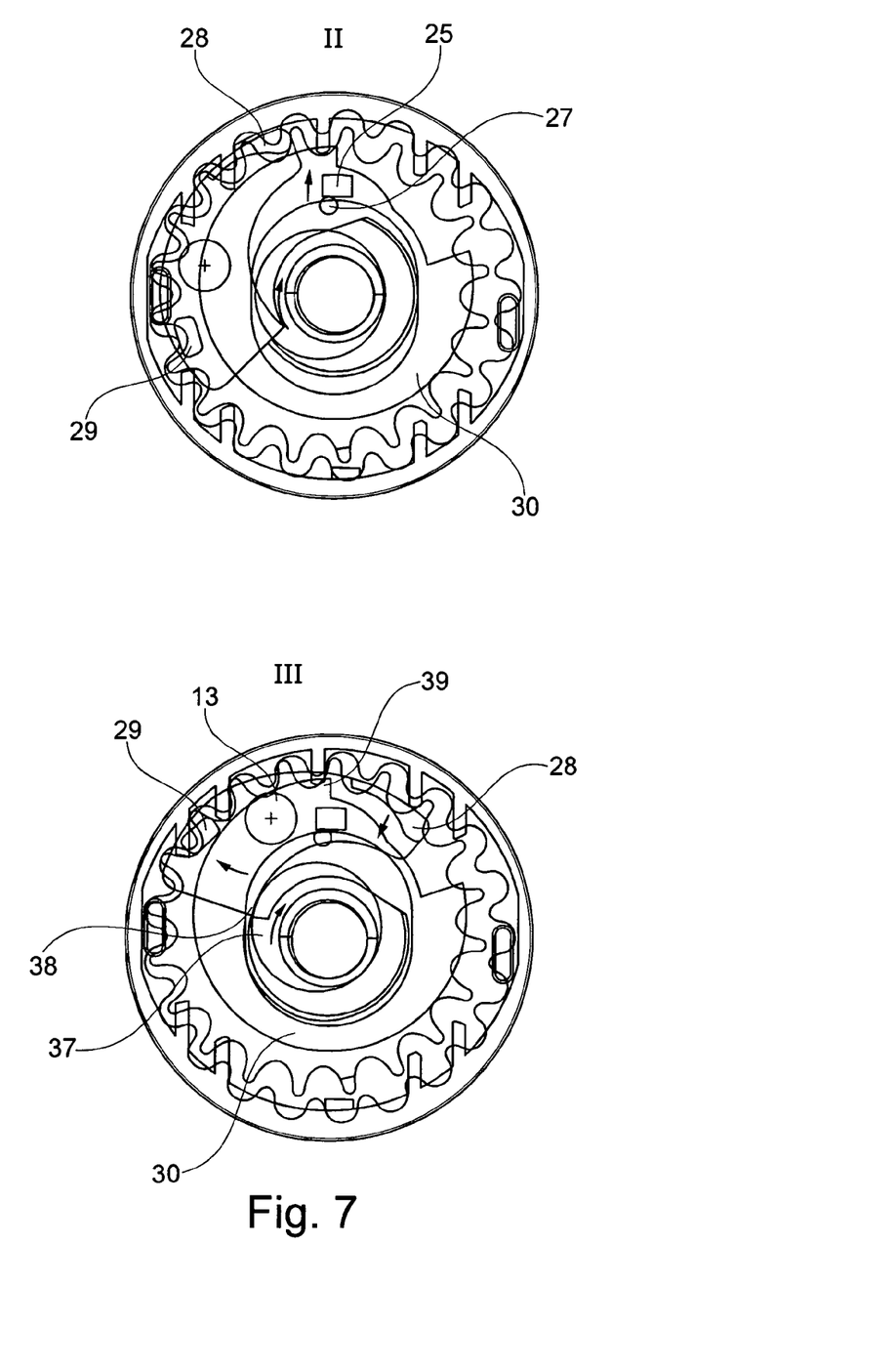

In FIG. 6 the locking part 11 is located in a position wherein it abuts with a locking edge 38 on a locking lug 37 of the locking contour and thereby connects the coupling part 8 to the take-up sleeve 12 in a direction of rotation of the belt shaft 2 as shown by the arrow, which corresponds to the extension direction of the seatbelt. This position of the components is present at the start of the extension movement of the seatbelt from the parked position, which is indicated in the diagram in FIG. 11 by S2. Due to the connection of the take-up sleeve 12 to the coupling part 8, in this position and during the start of the belt-extension movement both retraction springs 6 and 7 act with the total spring force on the depicted characteristic curve between the force F1 and F2. The cam contour 30 of the switching part 10 is located in this position of the components in such a position that the locking part 11 can revolve with the projections 28 and 29 without these coming abutting the cam contour. With a further rotation of the belt shaft 2 in the extension direction, shortly before an extension length S1 is reached the projection 27 of the wobble disc 9 abuts the projection 25 of the switching part 10, whereby the switching part 10 is displaced linearly upward in the arrow direction shown in FIG. 7. Due to displacement of the switching part 10 the cam contour 30 is displaced upward in the depiction so far that with further rotational movement of the belt shaft 2 in the belt extension direction the projection 29 abuts the radial outer side of the cam contour 30. Here the locking part 11, as shown by the arrows in the right illustration of FIG. 7, is forced to a pivoting movement about the bearing pin 13 until the projection 28 comes to rest at a distance behind a locking edge 39 of the cam contour 30. Subsequently the locking part 11 is pivoted further until the locking edge 38 loses contact with the locking lug 37 and the connection between the take-up sleeve 12 and the coupling part 8 is released. After the connection has been released, the locking part 11 can no longer be supported on the locking contour of the take-up sleeve 12, so that due to the spring force exerted by the second retraction spring 7 the locking part 11 is moved into the position shown in FIG. 8, wherein the projection 28 abuts the locking edge 39. Due to the released connection, the spring force of the second retraction spring 7 no longer acts between the housing 1 and the belt shaft 2 of the seatbelt retractor, and the total spring force acting on the belt shaft 2 drops from F2 to a value designated by F3. It is significant for the switching movement that the locking part 11 including the projection 28 is first pivoted behind the locking edge 39 before the locking edge 38 loses contact with the locking lug 37. With a correct design of the components, the reversal of rotation of the belt shaft 2 by 20 to 30 degrees is required, wherein the extension length S1 corresponds exactly to the position of the components for which the locking edge 38 loses contact with the locking lug 37.

Figure 8:
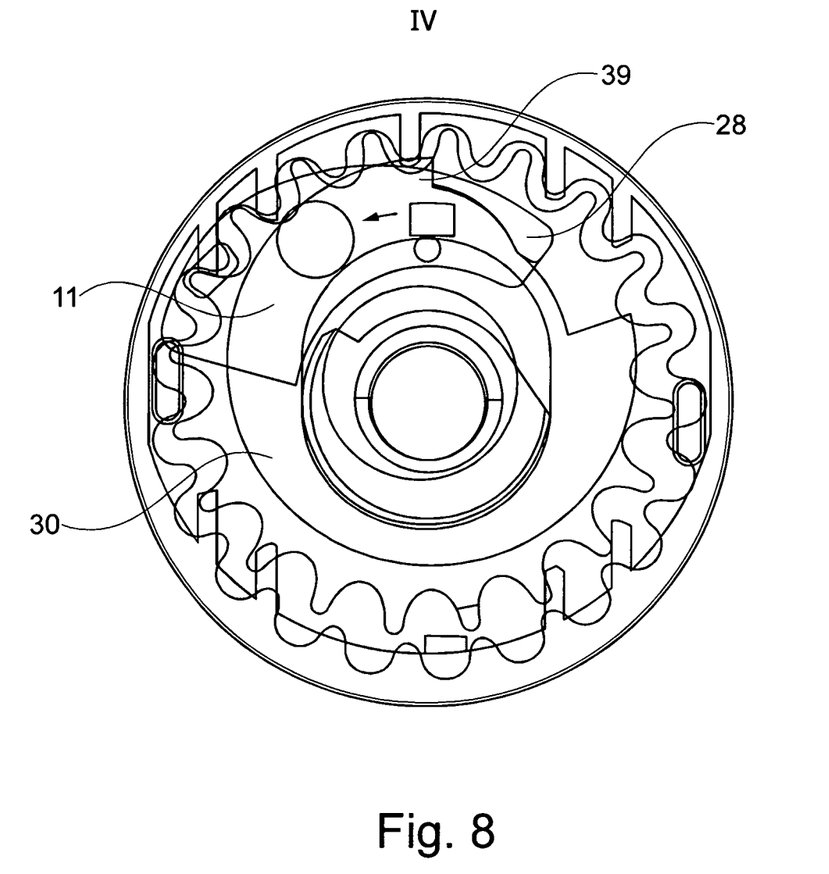

The position shown in FIG. 8 of the components is present during normal use of the seatbelt. Only the spring force of the first retraction spring 6 acts along the hysteresis loop between F3, F4, F5, and F6, wherein the extension length S1 represents the switching point, which is practically never achieved during normal extension and retracting movement of the seat belt.

When removing the seatbelt, in the left illustration of FIG. 9 the belt shaft 2 rotates counterclockwise in the arrow direction until the projection 26 of the wobble disc 9 impinges on the projection 24 of the switching part 10, and the switch part displaces downward in the arrow direction as can be seen in the right illustration of FIG. 9. Due to displacement of the switching part 10, the locking edge 39 moves out of contact with the end surface of the projection 28 so that due to the acting spring force of the second retraction spring the locking part 11 is rotated counterclockwise with respect to the locking part 10, as can be seen in FIG. 10. The projection 28 includes a control surface 41 on its radial inner side, by which the projection 28 slides on the locking edge, whereby during this back-rotation movement the locking part 11 is pivoted counterclockwise about the bearing pin 13 until the locking part finally abuts again, as can be seen in FIG. 6, on the locking edge 38 on the locking lug 37 of the locking contour of the take-up sleeve 12, and the coupling part 8 is connected to the take-up sleeve 12.

Due to this switching process the total spring force acting on the belt shaft 2 is increased from spring force F6 to spring force F7, and during the further retraction movement the seat belt is retracted along the curve with spring force increased from F7 to F8.

The switching device 33 is disposed in an installation-space-saving manner inside the innermost winding of the second retraction spring 7. For this purpose in particular the free space provided by the axial ring 14 is used, which is thus provided by the second end 17 being securely hung radially outward on the axial ring 14. The second retraction spring 7 is thus clearly held in the annular space between the axial ring 14 and the inner wall of the housing 4, so that the installation space radially inside the innermost winding or inside the axial ring 14 is deliberately kept free.

The switching device 33 is thus disposed such that it intersects the plane spanned by the second retraction spring 7. Apart from the section of the take-up sleeve 12 including the take-up contour 21, all components are thus located inside the disc-shaped installation space, which is delimited by the width of the second retraction spring 7. Thus the inventive two-spring comfort function requires installation space that is larger only by the width of the second retraction spring.

While the above description constitutes the preferred embodiment of the present invention, it will be appreciated that the invention is susceptible to modification, variation and change without departing from the proper scope and fair meaning of the accompanying claims.

The invention claimed is:

1. A seatbelt retractor for a seatbelt having a two-spring comfort function comprising:
   a belt shaft rotatably supported in a housing, on which the seatbelt is windable, and
   a first and a second retraction spring each being spring-preloaded in a winding direction of the seat belt, acting between the housing and the belt shaft,
   the first and second retraction springs are disposed between the belt shaft and the housing so as to act in parallel, and
   at least one of the first and second retraction springs is connected by an end to the belt shaft or the housing via a switching device switching as a function of the extension length of the seatbelt,
   wherein the end of one of the first and second retraction springs is held on a coupling part, on which a movable locking part is provided, which connects the coupling part to the belt shaft in a position, and
   wherein the movement of the locking part is controllable by the switching device, which includes a linearly displaceable switching part for controlling the movement of the locking part, and wherein the movement of the switching part is controlled by the switching device as a function of the extension length of the seatbelt.

2. The seatbelt retractor according to claim 1, wherein a take-up sleeve non-rotatably connected to the belt shaft is provided on the end of one of the first and second retraction springs is non-rotatably held and in which the locking part lockingly engages in the position connecting the coupling part to the belt shaft counter to the extension direction of the seatbelt.

3. The seatbelt retractor according to claim 1, wherein the switching part is non-rotatably attached to the housing and includes a cam contour on which the locking part abuts.

4. The seatbelt retractor according to claim 3, wherein a first and second projection is provided on the locking part, which each abut the cam contour depending on the position of the switching part, and in abutting the cam contour control the movement of the locking part during execution of a relative movement of the locking part with respect to the switching part.

5. The seatbelt retractor according to claim 1, wherein the movement of the locking part is controlled such that it is moved into a ready position for connecting the coupling part to the belt shaft or for releasing the connection of the coupling part to the belt shaft, from which ready position it is movable, supported by the spring force of one of the first and second retraction springs connected to the coupling part, into a final position that connects or does not connect the coupling part to the belt shaft.

6. The seatbelt retractor according to claim 1, wherein the first and second retraction springs are each formed as coil springs disposed parallel to each other, and the coupling part by a coupling disc disposed between the coil springs.

7. The seatbelt retractor according claim 1, wherein the locking part is formed by a pivotable locking pawl.

8. The seatbelt retractor according to claim 1, wherein the switching device includes an electrically operable motor.

9. The seatbelt retractor according to claim 1, wherein the movement of the locking part or the movement of the switching part is controllable by an actuator.

10. The seatbelt retractor according to claim 1, wherein the first and the second retraction springs are identical.

11. The seatbelt retractor according to claim 1, wherein the switching device is disposed to intersect at least one of the planes spanned by the first and second retraction springs.

12. The seatbelt retractor according to claim 11, wherein the switching device is disposed inside an innermost winding of one of the first and second retraction springs.

13. The seatbelt retractor according to claim 1, wherein the first and second retraction springs act on the belt shaft when the seatbelt is extended from the retractor less than a predetermined extension length, and only one of the first and the second retraction spring acting on the belt shaft upon switching of the switching device upon the extraction length exceeding the predetermined extension length.

14. A seatbelt retractor for a seatbelt having a two-spring comfort function comprising:
 a belt shaft rotatable supported in a housing, on which the seatbelt is windable, and
 a first and a second retraction spring each being spring-preloaded in a winding direction of the seat belt, acting between the housing and the belt shaft,
 the first and second retraction springs are disposed between the belt shaft and the housing so as to act in parallel, and
 at least one of the first and second retraction springs is connected by an end to the belt shaft or the housing via a switching device switching as a function of the extension length of the seatbelt,
 wherein the switching device comprises a mechanical counting mechanism driven by the belt shaft, the counting mechanism including a wobble disc driven by the belt shaft via an eccentric, which wobble disc wobbles in a gearing, fixed with respect to the housing, due to the eccentric drive via the belt shaft, and wherein two projections are provided, one of which is on the wobble disc and another one of which is on the switching part, which each abut one other in pairs in a position and thereby force the linearly switching movement of the switching part.

15. The seatbelt retractor according to claim 14, wherein the end of one of first and second retraction springs is held on a coupling part, on which a movable locking part is provided, which connects the coupling part to the belt shaft in a position, and
 wherein the movement of the locking part is controllable by the switching device.

16. The seatbelt retractor according to claim 15, wherein the switching device comprises a linearly displaceable switching part for controlling the movement of the locking part, and wherein the movement of the switching part is controlled by the switching device as a function of the extension length of the seatbelt.

\* \* \* \* \*